US010340557B2

(12) United States Patent
Hinterberger et al.

(10) Patent No.: US 10,340,557 B2
(45) Date of Patent: Jul. 2, 2019

(54) BATTERY FOR A MOTOR VEHICLE AND MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 67 days.

(21) Appl. No.: 15/554,810

(22) PCT Filed: Feb. 25, 2016

(86) PCT No.: PCT/EP2016/054023
§ 371 (c)(1),
(2) Date: Aug. 31, 2017

(87) PCT Pub. No.: WO2016/139132
PCT Pub. Date: Sep. 9, 2016

(65) Prior Publication Data
US 2018/0241094 A1 Aug. 23, 2018

(30) Foreign Application Priority Data
Mar. 5, 2015 (DE) .................. 10 2015 002 827

(51) Int. Cl.
*H01M 10/42* (2006.01)
*H04Q 9/00* (2006.01)
(Continued)

(52) U.S. Cl.
CPC ..... *H01M 10/4257* (2013.01); *H01M 2/1077* (2013.01); *H01M 10/425* (2013.01);
(Continued)

(58) Field of Classification Search
CPC .................. H01M 2010/4278; H01M 2220/30
See application file for complete search history.

(56) References Cited

U.S. PATENT DOCUMENTS 9,269,992 B2 2/2016 Okamura et al.
9,793,578 B2 10/2017 Fink
(Continued)

FOREIGN PATENT DOCUMENTS

| CN | 101916883 A | 12/2010 |
| CN | 102637915 A | 8/2012 |

(Continued)

OTHER PUBLICATIONS

Notification of Transmittal of Translation of the International Preliminary Report on Patentability dated Sep. 14, 2017, in connection with corresponding international application No. PCT/EP2016/054023 (10 pages).

(Continued)

*Primary Examiner* — Olatunji A Godo
(74) *Attorney, Agent, or Firm* — Maier & Maier, PLLC

(57) ABSTRACT

A battery for a motor vehicle with a plurality of battery cells, wherein the respective battery cell include a battery cell housing, in which a galvanic element is accommodated. Via two electrical connection terminals, the battery cell is electrically connected to at least one further battery cell of the battery. A control device of the respective battery cell is coupled to at least one communications device. Here, the at least one communications device of the battery cell is designed for the purpose of communicating with at least one adjacent battery cell of the respective battery cell in a first mode.

10 Claims, 11 Drawing Sheets

(51) Int. Cl.
*H01M 2/10* (2006.01)
*B60L 58/21* (2019.01)
(52) U.S. Cl.
CPC ............... *H04Q 9/00* (2013.01); *B60L 58/21* (2019.02); *H01M 2010/4278* (2013.01); *H01M 2220/20* (2013.01); *H04Q 2209/40* (2013.01); *H04Q 2209/43* (2013.01)

(56) References Cited

U.S. PATENT DOCUMENTS

| | | | |
|---|---|---|---|
| 9,846,198 B2 | 12/2017 | Butzmann | |
| 2012/0112685 A1* | 5/2012 | Hartley | B60L 3/0038 320/106 |
| 2012/0206102 A1 | 8/2012 | Okamura et al. | |
| 2014/0203644 A1 | 7/2014 | Schroff et al. | |
| 2014/0229129 A1 | 8/2014 | Campbell et al. | |
| 2014/0302352 A1 | 10/2014 | Lenz et al. | |

FOREIGN PATENT DOCUMENTS

| | | | |
|---|---|---|---|
| CN | 103971504 | A | 8/2014 |
| CN | 103975478 | A | 8/2014 |
| CN | 104103863 | A | 10/2014 |
| CN | 104380563 | A | 2/2015 |
| CN | 204144394 | U | 2/2015 |
| DE | 102010045037 | A1 | 3/2011 |
| DE | 112010003272 | T5 | 1/2013 |
| DE | 102011082937 | A1 | 3/2013 |
| DE | 102011088440 | A1 | 6/2013 |
| DE | 102012202754 | A1 | 8/2013 |
| DE | 102013201165 | A1 | 7/2014 |
| DE | 102014101391 | A1 | 10/2014 |
| EP | 2296214 | A1 | 3/2011 |

OTHER PUBLICATIONS

Examination Report dated Nov. 2, 2015 of corresponding German application No. 102015002827.8; 5 pgs.

Examination Report dated Feb. 16, 2017 of corresponding German application No. 102015002827.8; 6 pgs.

International Search Report dated May 10, 2016 of corresponding International Application No. PCT/EP2016/054023; 15 pgs.

Chinese Office Action dated Jan. 14, 2019 in corresponding Chinese Application No. 201680013647.5; 11 pages including partial human-generated English-language translation.

* cited by examiner

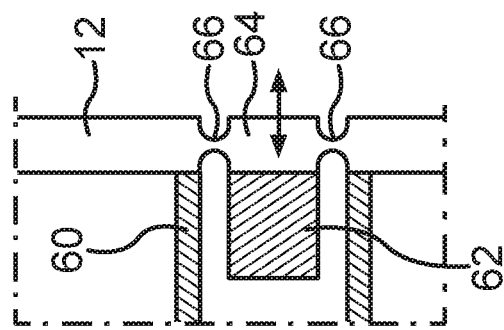
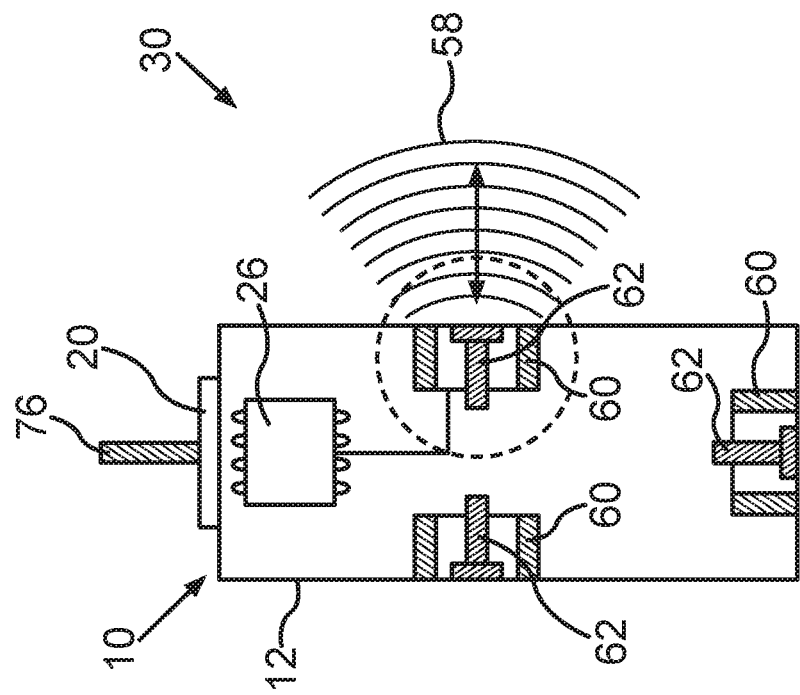
Fig.5

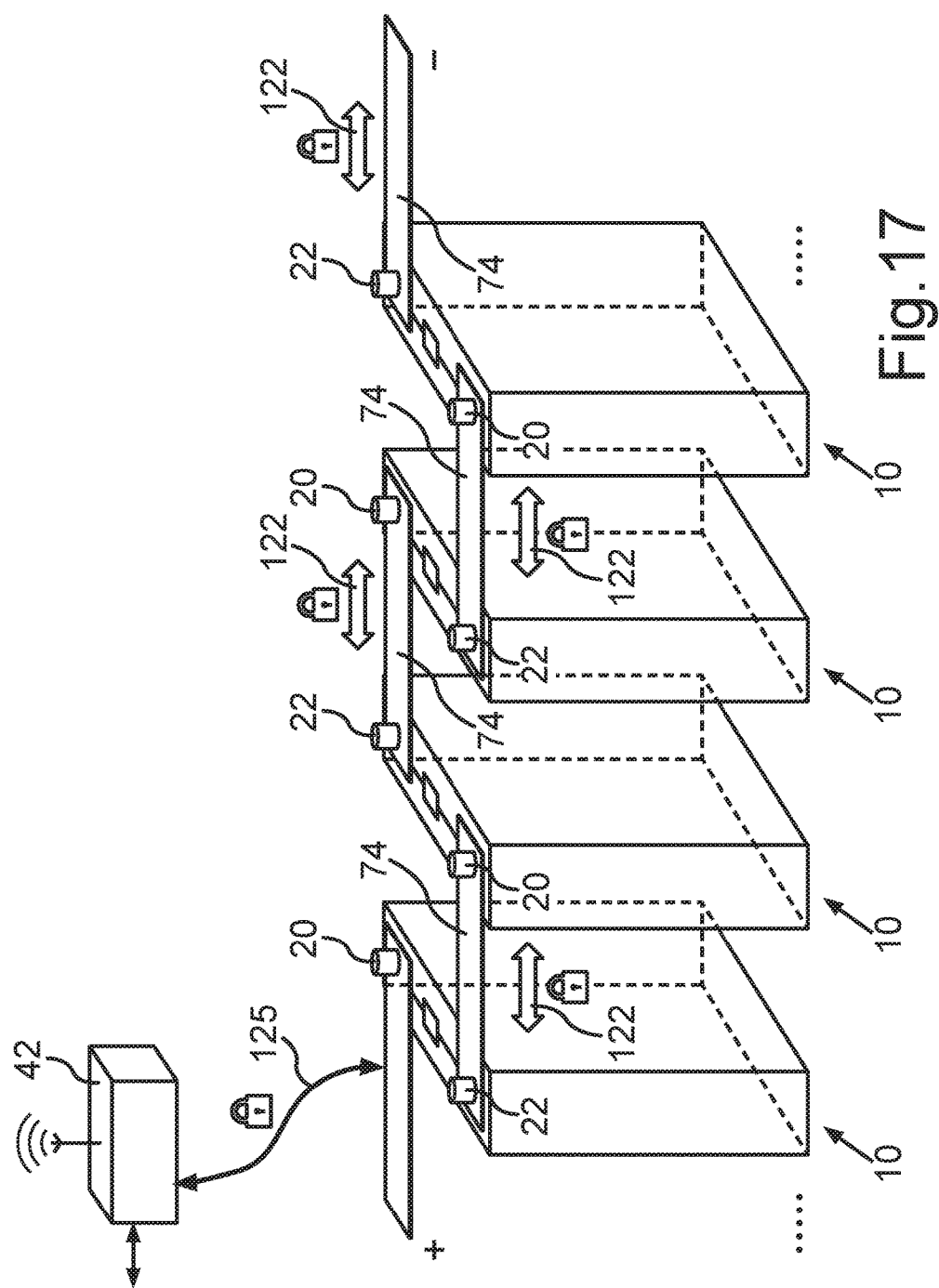

BATTERY FOR A MOTOR VEHICLE AND MOTOR VEHICLE

FIELD

The invention relates to a battery for a motor vehicle with a plurality of battery cells. The respective battery cell has a battery cell housing, in which a galvanic element is accommodated. Via two electrical connection terminals, the respective battery cell can be connected accommodated to at least one further battery cell of the battery. The respective battery cell further comprises a control device, which is coupled to at least one communications device of the battery cell. The invention further relates to a motor vehicle having at least one such battery.

BACKGROUND

It is known from the prior art, for instance, from DE 10 2010 045 037 A1, to interconnect a plurality of battery cells for supplying a specific voltage or a specific current to a battery. Such batteries are employed at the present time, in particular, as traction batteries in motor vehicles, such as, for instance, electric vehicles or hybrid vehicles, for supplying electric drive energy.

DE 11 2010 003 272 T5 describes a battery cell with sensor elements integrated in the battery cell. The sensor elements are designed for measuring parameters of the battery cell, such as a temperature, a pressure, and electric variables, as well as electrochemical properties of the battery cell. The sensor elements can be coupled to a communications device, which transmits data and information to a data processing device arranged outside of the battery cell. However, the battery cell itself can also be furnished with a device for saving, for transmitting, for receiving, and for processing data.

SUMMARY OF THE DISCLOSURE

The object of the present invention is to create a battery of the type named above and a motor vehicle having such a battery, wherein the battery makes possible an improved communication.

In the battery according to the invention, the at least one communications device of the battery cell is designed for the purpose of communicating with at least one battery cell adjacent to the respective battery cell in a first mode. Furthermore, the at least one communications device is designed for the purpose of communicating with at least one master control device of the battery in a second mode, which differs from the first mode. Accordingly, it is possible to use especially well adapted types of communication at the respective receiver, which make possible a data transmission that is especially reliable and especially secure against interference. As a result of this, the battery is improved in terms of communication of the battery cells with one another as well as in terms of communication of the battery cells with the at least one master control device of the battery.

The galvanic element is preferably designed as a secondary element, which can be discharged for supply of an electrical component and, after being discharged, can be recharged. In this case, the galvanic element comprises, in a way that is known as such, arresters roughly in the form of metal foils, which are coated with the electrochemically active material of the electrodes of the galvanic element. Further provided is an electrolyte as well as a separator, which isolates the electrochemically active materials from one another. In such a galvanic element, the arresters can be stacked, folded, or wound, so that the galvanic element may also be referred to as a cell stack or cell winding.

The provision of the control device imparts an intelligence to the battery cell; that is, the battery cell is designed as a so-called "smart cell" (intelligent battery cell). The control device can be a local computing unit in the form, for instance, of a microcontroller, an application-specific integrated circuit (ASIC), or a field programmable gate array (FPGA).

Preferably, however, the master control device, which is capable of issuing commands to a plurality of battery cells of the battery, is designed as the external control device.

By means of the control device of the respective battery cell, it is possible to detect or record information relating to the battery cell, such as, for example, a voltage that the galvanic element of the respective battery cell supplies. Furthermore, it is possible by means of the control device to detect or record also the current flowing through the battery cell during operation of the battery. Data of this kind, relating to the electric energy of the respective battery cell, can be transmitted to the master control device of the battery. It is thereby possible for the data to be transmitted, in particular, in a form that has been processed by the control device of the respective battery cell through analysis.

Furthermore, the control device of the respective battery cell is preferably coupled to at least one sensor, which detects or records further variables relating to the battery cell. Sensors of this kind can record, in particular, parameters such as a pressure in the interior of the battery cell housing, a temperature of the battery cell, mechanical stresses, a nature of an electrolyte of the galvanic element, and the like, and transmit corresponding measured values to the control device of the battery cell. The control device of the respective battery cell can transmit the data originating from the measured values or from an analysis of the measured values to the control device of another battery cell and/or to the master control device.

In this way, for example, the communication between the battery cell and the master control device of the battery enables the master control device to be informed at all times about the current state of the battery cells as well as about the states that occurred in the past.

In an advantageous embodiment, the respective battery cell comprises at least one device for producing and for receiving pressure waves for communication in the first mode. In the case of communication by means of pressure waves or longitudinal waves, no electrical contact between galvanically coupled or decoupled battery cells is needed. Instead, solely a connection that is suitable for the transmission of the pressure waves needs to exist. Through such a way of communication, it is possible to achieve an especially reliable and secure transmission of data to adjacent battery cells. In particular, it is thereby possible for information to be transmitted from a first battery cell of a group of battery cells to a last battery cell of the group, without data transmission lines or the like being necessary for this purpose. This makes the communication possible in an especially economical manner.

The device for producing and receiving pressure waves can be arranged, in particular, inside the battery cell housing, for instance, at a wall of the battery cell housing. This is advantageous, in particular, when the device comprises a coil and a magnet that can move relative to the coil. Namely, communications elements of this kind then cause very little interference and they do not increase the bulk of the battery cell.

Additionally or alternatively, the device for producing and receiving pressure waves can be designed as a piezo element, which in-couples mechanical vibrations, in particular, in the ultrasound region, into the battery cell housing and/or into at least one of the electrical connection terminals of the battery cell. Such a piezo element is especially robust and reliable in terms of the transmission of data by means of pressure waves. In addition, a piezo element can have a relatively flat form, so that it is also readily possible to create an arrangement at an outer side of the battery cell.

Furthermore, for communication in the first mode, the respective battery cell can comprise at least one device for receiving magnetic waves, for example in the form of at least one coil. In particular, namely, low-frequency magnetic fields have proved well suited for the transmission of data over relatively short distances. Because the battery cell housings of the battery cells, which are often fabricated from aluminum, exhibit a very small damping for low-frequency magnetic fields, the corresponding device can be well arranged inside the battery cell housing. However, it is also possible, in particular, for a coil of flat form to be attached on the outside to the battery cell housing as a kind of foil, for example, by adhesive bonding, for instance. Furthermore, it is possible to arrange component elements designed for the detection of magnetic fields, such as coils, both inside the battery cell housing and also at an outer side of the battery cell housing.

The arrangement of the device for producing and receiving magnetic waves inside the battery cell housing, however, facilitates the coupling with the control device of the battery cell, which brings about the emission of magnetic waves by means of the device or records the signal received by the device and, in particular, analyzes said signal.

The frequency that is suitable for data transmission by means of magnetic waves depends on the distance to be bridged and on the materials of the battery cell, in particular, on the material of the battery cell housing. The frequency of the magnetic waves can be, in particular, several 100 Hertz or less than 100 Hertz.

It has proven further advantageous when, for communication in the first mode, the respective battery device comprises at least one device for producing and receiving electromagnetic terahertz waves. Namely, waves of this kind have a very small range in air—for example, a range of a few centimeters. Accordingly, a transmission from one battery cell to the adjacent battery cell is ensured. However, this mode of communication results in hardly any interfering influence going beyond the adjacent battery cell. In order for the communication of the battery cells to interfere with one another, it would be necessary to bring a corresponding emitter of interference physically to within a few centimeters of the respective battery cell. Because this is not expected to occur, a communication via electromagnetic terahertz waves is especially secure against interference.

In order to be able to transmit the terahertz waves from the battery cell to the adjacent battery cell with very little required energy, the device for producing and receiving terahertz waves is preferably arranged at an outer side of the battery cell housing.

It has been shown as further advantageous when, for communication in the first mode, the respective battery cell comprises at least one device for producing and for receiving electromagnetic gigahertz waves and/or megahertz waves. By means of electromagnetic waves of this kind, it is possible, in particular, to realize a transmission of data to the respectively adjacent battery cell as well as beyond it. Therefore, the device for producing and for receiving electromagnetic gigahertz waves and/or megahertz waves is also suitable for communication in the second mode.

In addition, it is possible by means of a device of this kind to implement especially well methods that lead to a secure and reliable communication of the battery cells with one another or of the battery cells with the master control device. For example, a time division duplex (TDD) method, a time division multiplex (TDM) or time division multiple access (TDMA) method, and/or a frequency-division multiplexing (FDM) or a frequency division multiple access (FDMA) method are employed in order to transmit the messages. It can thus be ensured especially well that the gigahertz waves or megahertz waves of different transmitting communications devices do not overlap or otherwise interfere with one another.

It is also possible to arrange the device for producing and receiving gigahertz waves or megahertz waves at the outer side of the battery cell housing in order that a data transmission is possible with relatively low transmitting power.

When the battery cell has the device arranged at the outer side of the battery cell housing, it is possible to provide means for wireless energy transmission from the galvanic element of the respective battery cell to this device. Namely, it is then not necessary to pass any energy-transmitting cable through the battery cell housing. Offered, in particular, for wireless energy transmission in this case is inductive transmission by means of magnetic fields. However, a capacitive energy transmission or an electromagnetic energy transmission is also possible.

Furthermore, in the case of arrangement of the device at the outer side of the battery cell, it is possible to ensure the energy supply, in particular, via the two connection terminals of the battery cell. In this way, namely, it is possible to realize a wired energy transmission in an especially simple manner.

The battery can further have means for data transmission from the control device to the device arranged at the outer side of the battery cell housing, which, for example, can comprise a data cable. Here, too, however, a wireless data transmission is advantageous, because no data transmission line then needs to be passed through the battery cell housing.

It is also possible to ensure the energy transmission to the control device and/or to the at least one communications device inside the battery cell via corresponding cables or wirelessly. It is possible, for example, to provide lightwave guides for data transmission or the same cable can be utilized both for the data transmission and for the energy transmission.

In an especially simple manner, it is possible to supply the control device and/or the communications device with electric energy when it is connected to the galvanic element of the battery cell in an electrically conductive manner. In this way, in addition, it is possible by means of the control device to determine electric variables of the battery cell in an especially simple manner.

It is further preferred if the control device of the respective battery cell and the at least one master control device of the battery form network nodes of a meshed network. Namely, an especially high reliability is then provided, because a specific data set can be conveyed on different signal paths to the respective receiver. In the event of failure of a network node, it is thus possible to create a detour via other network nodes in order to transmit the data to the respective receiver or in order to receive corresponding signals from the transmitter.

The corresponding advantages ensue to a special degree if the network is formed as a completely meshed network, in which each network node is connected to every other network node.

The formation of the control devices as network nodes of a meshed network is advantageous, in particular, when the communication occurs via electromagnetic gigahertz waves and/or megahertz waves.

An especially well-organized communication can be achieved, moreover, when the battery comprises a plurality of battery modules, each of which has a group of battery cells, wherein the at least one master control device comprises a module controller, which is designed for communication with the battery cells of the respective battery module. It is then not necessary for all battery cells to communicate with the same master control device. Instead, only the battery cells that belong to the respective battery module transmit data to the module controller and/or receive commands from the module controller. This simplifies the communication.

In this case, the at least one master control device further comprises a battery controller of the battery and the module controller is designed for communication with the battery controller. It is possible, therefore, to transmit data from the module controller to the battery controller and to receive data and commands from the battery controller. Such a master battery controller can ensure, in particular, that the communication between the module controllers and the battery cells of the respective battery module occur in an orderly manner and, in particular, do not occur simultaneously, so that any mutual interference is prevented to an especially great extent.

In particular, the communication between the module controller and the battery cells can occur via Bluetooth, WLAN, or WiFi, preferably via Bluetooth low energy (BTLE). In this way, it is possible to issue commands to all battery cells in a simple manner, for example, by way of a broadcast. Furthermore, the module controller can thereby query the battery cells in succession in regard to parameters relating to the battery cells. It is thus possible to establish reliably and quickly whether a change in state has taken place at one of the battery cells in regard to at least one parameter.

Finally, it has been shown to be advantageous if the respective battery cell has a modulation device, which is designed for the purpose of exchanging data, via an electrical connecting element, with the at least one other battery cell and/or with the master control device. In this case, the electrical connecting element connects the battery cell to the at least one other battery cell of the battery and/or to the master control device. Such a communication requires especially little expenditure, because the electrically conductive connecting elements between the battery cells are present in any case and are therefore available as potential data transmission lines.

In particular, the data exchange between the individual battery cells can also occur via electrical connecting elements in the form, for instance, of bus bars or the like, which connect the electrical connection terminals or terminals of the battery cells with one another in an electrically conductive manner. In the process, the data to be transmitted are modulated on the power grid formed by interconnection of the battery cells by means of the modulation devices. It is thereby possible to phase-modulate and/or amplitude-modulate a plurality of signals on one or a plurality of carrier frequencies.

In particular, it is possible by way of different modulation methods or through the use of different channels in an available frequency spectrum to implement the first mode of communication and the second mode of communication. It is also possible to transmit identical information on different channels in order to especially minimize the susceptibility of the communication to interference. Additionally or alternatively, the information can be transmitted on different channels in a distributed manner, so that errors can be detected and an especially secure operation is made possible through an error correction.

For an especially good and effective data transmission, in particular in the case of a large number of participants in the form of battery cells, the master control device can serve as a central coordinator. The master control device can thus ensure that the bandwidth of frequencies that is available can be utilized in an especially broad manner. It is also possible by means of such a battery controller to synchronize the data transfer and thereby to divide up dynamically the total available bandwidth among the participants in the form of battery cells in the network.

Both for the communication in the first mode and for the communication in the second mode, it is possible, furthermore, to employ encryption methods, such as, for example, an AES-128 encryption.

Beyond this, it is possible by means of so-called broadcast commands to provide information to all battery cells simultaneously. Furthermore, messages or commands that are to be transmitted can be furnished with priorities in order that it is ensured that important commands are executed preferentially.

Such an important command, for example, can relate to the change of a switch element of the respective battery cell. Namely, the respective battery cells can have a switch element, which is designed for interrupting and for making a connection in an electrically conductive manner between an arrester of the galvanic element and at least one of the electrical connection terminals of the battery cell. In this case, the control device of the battery cell is designed for the purpose of changing a switching state of the switch element on command of the master control device.

This enables volt-free switching of at least one of the electrical connection terminals—and, when two switch elements are provided, of both electrical connection terminals—of the battery cell. In this way, it can be ensured that an electric voltage is present at the electrical connection terminals of the battery cell only when this is desired. This makes possible an especially safe operation and handling of the battery cell. Namely, a battery cell whose electrical connection terminals are switched in a volt-free manner can be handled without danger. In addition, when a defect in the battery cell occurs, it is possible to sever the electrically conductive connection between the arrester and at least one of the electrical connection terminals. As a result, no danger can arise any longer from this battery cell.

By opening of the switch element and thereby interrupting the electrically conductive connection between the arrester and the connection terminal, the battery cell is virtually disconnected from the network.

It is thereby possible, particularly when a battery that comprises a plurality of battery cells and correspondingly can supply a high voltage is assembled, to ensure a high-voltage protection. The battery can namely be, in particular, a high-voltage battery, that is, a battery that has a voltage of more than 60 volts. In particular, the high-voltage battery can be designed for the purpose of supplying voltages such as those employed in traction batteries of motor vehicles, that is, voltages in the range of several hundred volts. By interrupting the electrically conductive connection, it is possible in a transport state as well, that is, for example, when the battery is being transported to its site of operation, to ensure that no dangers associated with a high voltage can arise from the battery.

The switch element, by means of which the electrically conductive connection between the arrester and the at least one connection terminal of the battery cell can be interrupted, may also be referred to as a current interrupt device (CID). What is involved in the present embodiment is preferably an electronic current interrupt device that is engaged by the control device of the battery cell. For this purpose, the switch element can be designed, in particular, as a semiconductor component, to which a control voltage is applied by the control device of the battery cell for adjusting the respective switching state. This makes it possible, particularly in the case of a deliberate interruption of the electrically conductive connection, to take into account a plurality of parameters, for instance by establishing switching criteria in the control device of the battery cell.

Furthermore, the switch element can be closed on command, so that the electrically conductive connection is made. The voltage of the galvanic element is then applied at the connection terminals of the battery cell. However, only an authorized master control device is capable of actually allowing the switch element to be actuated by means of the control device internal to the battery cell, that is, is capable of changing the switching state as desired. This makes the switching of the switch element especially secure.

The motor vehicle according to the invention comprises at least one battery according to the invention. The motor vehicle can be designed, for example, as a passenger car, in particular as an electric vehicle or hybrid vehicle. Furthermore, the motor vehicle can also be an electrically driven motorcycle or an electrically driven bicycle.

It is further possible to provide the battery in a stationary energy storage system. Beyond this, it can be provided that the battery, which has been provided in a motor vehicle, is reused as a so-called second life battery, for which, therefore, the battery is conveyed to a different kind of use. In particular, in the case of second life applications, it is namely possible for the requirements placed on the efficiency of the battery cells to be less stringent, for instance, than for use of the battery cells for the battery of the motor vehicle.

The features and combinations of features named above in the description as well as the features and combinations of features named below in the description of the figures and/or shown in the figures alone can be used not only in the respectively indicated combination, but also in other combinations or alone, without departing from the scope of the invention. Accordingly, embodiments that are not explicitly shown or explained in the figures are also to be regarded as comprised and disclosed by the invention, although they ensue and can be produced from separate combinations of features from the explained embodiments.

BRIEF DESCRIPTION OF THE DRAWINGS

Further advantages, features, and details of the invention ensue from the claims, the following description of preferred embodiments, as well as on the basis of the drawings. Shown are:

FIG. 5 schematically, in a sectional illustration, one of the battery cells, which has a device for producing pressure waves, wherein, in addition, a portion of a wall of the battery cell housing is illustrated in detail, enlarged;

FIG. 17 schematically, the transmission of data, via bus bars, between the individual battery cells of the battery and to a master control device.

DETAILED DESCRIPTION OF THE DRAWINGS

Figure 1:
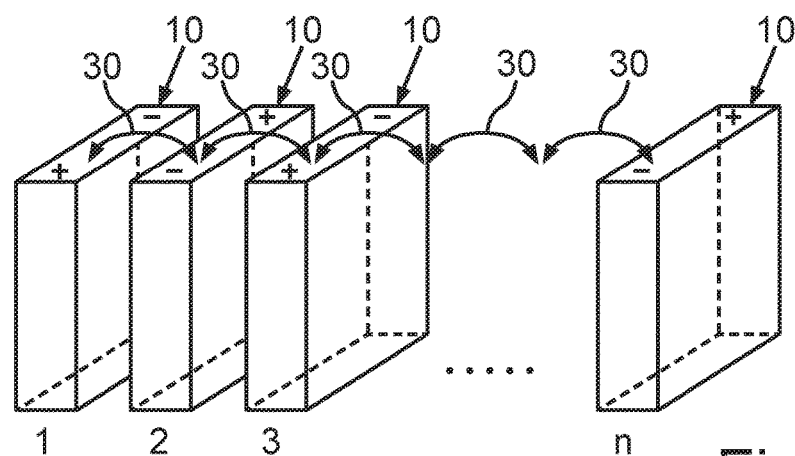
FIG. 1 schematically, battery cells of a battery, wherein a respective battery cell forwards a message to the respective adjacent cell.

Schematically shown in FIG. 1 are battery cells 10, such as those that can be employed, for example, in a battery 28 (compare FIG. 3) of a motor vehicle. For this purpose, the respective battery cell 10 can be designed, for instance, as a lithium ion cell. In the battery 28, which can serve as a traction battery in the motor vehicle, usually a plurality of such battery cells 10 are electrically connected in series and/or in parallel in order to supply correspondingly high voltages and currents.

In the case of a series connection of such battery cells 10, it is possible overall for a very high voltage, namely, a voltage of several hundred volts, of the battery 28 to occur, because, for instance, a plurality of battery modules (compare FIG. 2), each of which contains a plurality of battery cells 10, are connected to one another in an electrically conductive manner.

Figure 16:
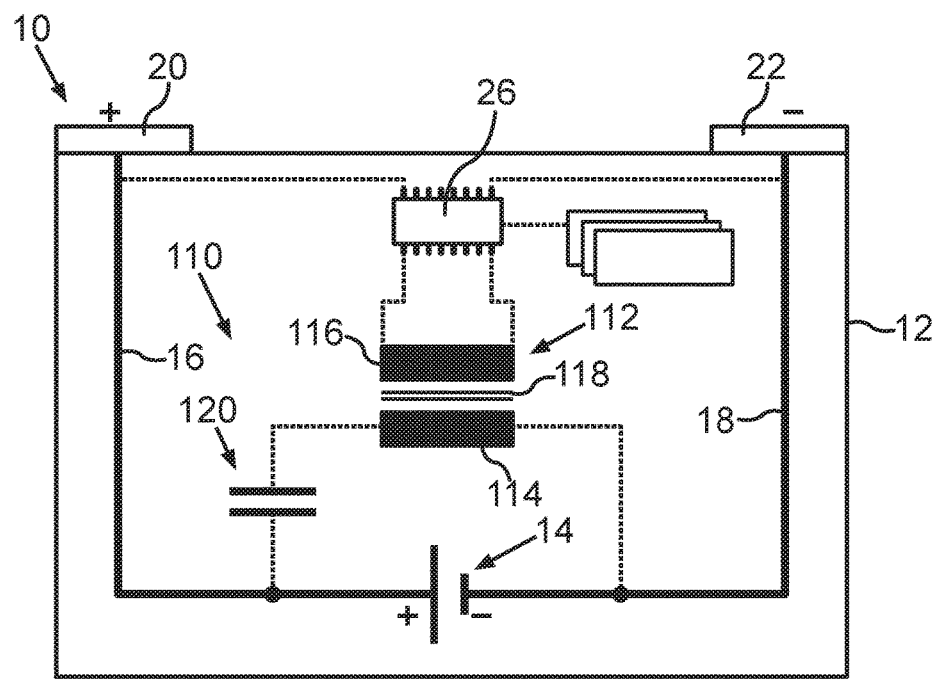
FIG. 16 schematically, the battery cell with the modulation device in accordance with FIG. 15, which enables data to be modulated on the power grid.

An individual battery cell 10 is illustrated in detail in FIG. 16. Accordingly, the battery cell 10 comprises a battery cell housing 12, which, in the present case, has a prismatic design by way of example. Arranged inside of the battery cell housing 12 is a galvanic element 14, which comprises arresters 16, 18, coated with a respective electrochemical material. In the present case, for simplicity, the electrodes of the galvanic element 14, comprising the electrochemically active material and the arresters 16, 18, are illustrated only by the arrester 16 leading to a first electrical connection terminal 20 (for instance, a plus pole) of the battery cell 10 and by the arrester 18 leading to a second electrical connection terminal 22 of the battery cell 10, that is, the arrester 18 leading to the minus pole.

In the case of the battery cell 10 shown in FIG. 1, it is possible to sever the galvanic element 14 electrically from at least one of the connection terminals 20, 22. Provided for this purpose is a switch element (not shown in the present case), by means of which an electrically conductive connection between the arrester 16 and the connection terminal 20 can be interrupted by opening the switch element. By closing the switch element, it is possible to reestablish the electrically conductive connection between the arrester 16 and the connection terminal 20.

The switch element, which, in particular, can be designed as a semiconductor component, is switched, for example, by a control device 26 of the battery 10 designed as a microcontroller. In the present case, the control device 26 is arranged inside the battery cell housing 12.

The control device 26 is coupled to at least one communications device, which enables the respective battery cell 10 to communicate with its surroundings. In this case, the at least one communications device of the battery cell 10 is designed for the purpose of communicating with an adjacent battery cell 10 in a first mode 30, which is illustrated in FIG. 1 by respective arrows. For this first mode 30 of communication, the data transmission from one battery cell 10 to the next battery cell 10 thus occurs from adjacent cell to adjacent cell.

Figure 2:
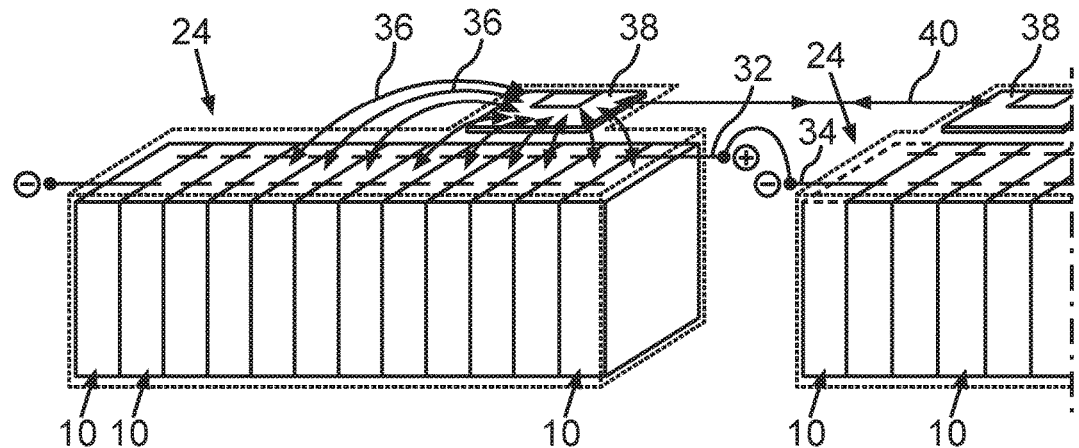
FIG. 2 two battery modules of a battery, wherein the battery cells of a respective battery module communicate with a module controller, and the module controllers of the battery modules are designed for data exchange with one another.

From FIG. 2, it can be seen that the battery cells 10 of the battery 28 can be combined into groups, which form the respective battery module 24. Inside the battery module 24, the individual battery cells 10 can be electrically connected in parallel and/or in series. In the present case, for example, an electrically positive module connection terminal 32 of the first battery module 24 is connected in an electrically conductive manner to a negative module connection terminal 34 of the second battery module 24, so that the two battery modules 24 are electrically connected in series. In alternative embodiments, the battery modules 24 can also be connected in parallel.

In the respective battery module 24, the individual battery cells 10 are not only electrically connected with one another, but also mechanically joined. For this purpose, it is possible to use, for example, feed-through connectors 74 (compare FIG. 17), which are also referred to as bus bars. In addition, the respective battery module 24 can have a module housing, in which the individual battery cells 10 are arranged.

In the present case, the at least one communications device of the respective battery cell 10 is also designed for the purpose of communicating with a master control device of the battery 28 in a second mode 36, which is likewise illustrated by arrows in FIG. 2. The second mode 36 of data exchange or communication differs in this case from the first mode 30 of data exchange or communication.

The master control device, with which the respective battery cells 10 of the battery module 24 communicate, can be, for example, a module controller 38. The module controllers 38 of the respective battery module 24 can also communicate with one another, this being illustrated in FIG. 2 by corresponding double arrows 40.

Figure 3:
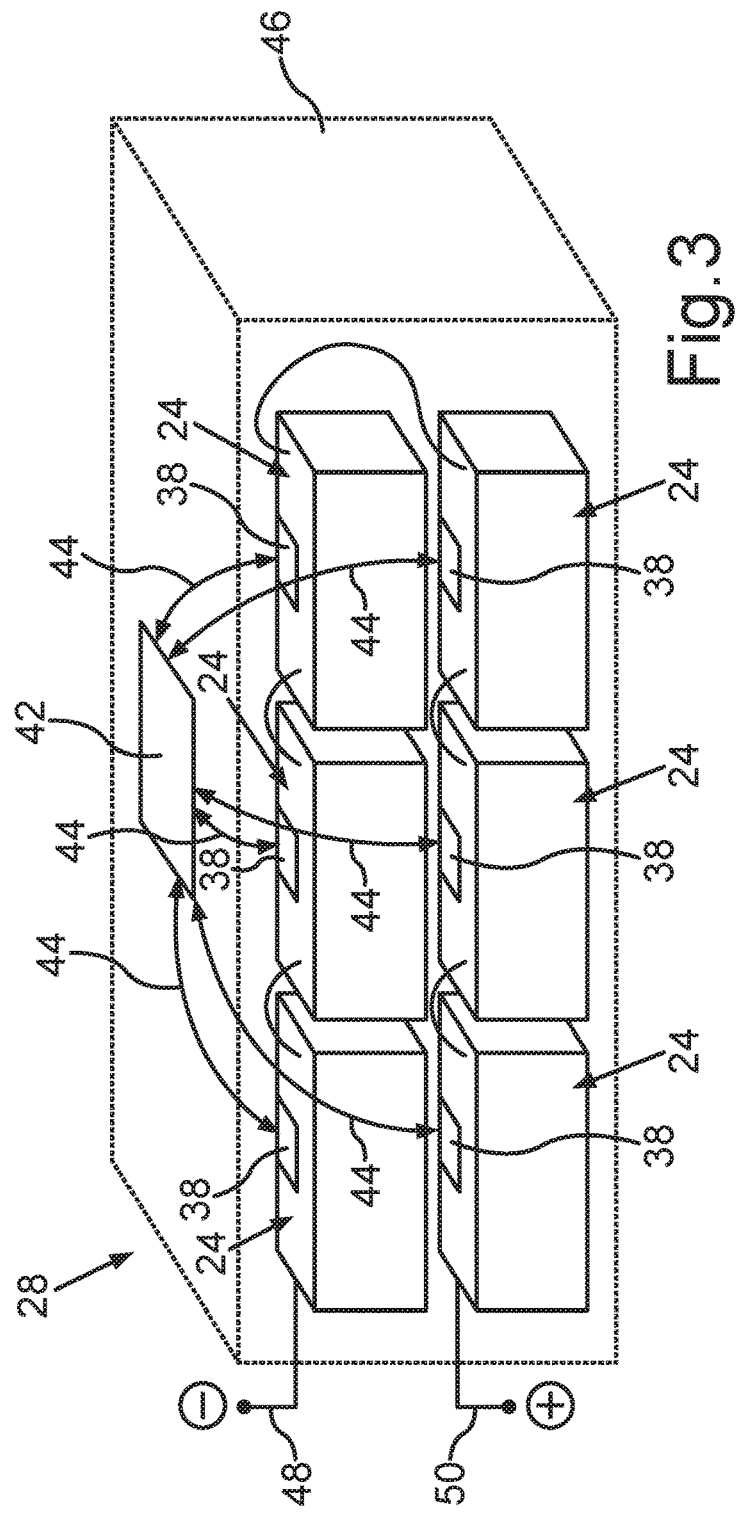
FIG. 3 schematically, the battery, which comprises a plurality of battery modules in accordance with FIG. 2, wherein the module controllers of the respective battery module are designed for communication with a master battery controller.

As can be seen, in particular, from FIG. 3, however, the module controllers 38 of the respective battery modules 24 are not only capable of exchanging data with one another and with the battery cells 10, but also are capable of communicating with a further master control device of the battery 28. This further control device can be, for example, a battery controller 42 of a battery management system of the battery 28. The communication of the module controller 38 with the battery controller 42 is illustrated in FIG. 3 by corresponding additional arrows 44.

As ensues furthermore from FIG. 3, the battery 28 can have a battery housing 46. At the high-voltage connection terminals 48, 50 a correspondingly high voltage can be supplied by the battery 28, such as is provided, for example, when the battery 28 is used as a traction battery in an electric vehicle or in a hybrid vehicle.

Figure 4:
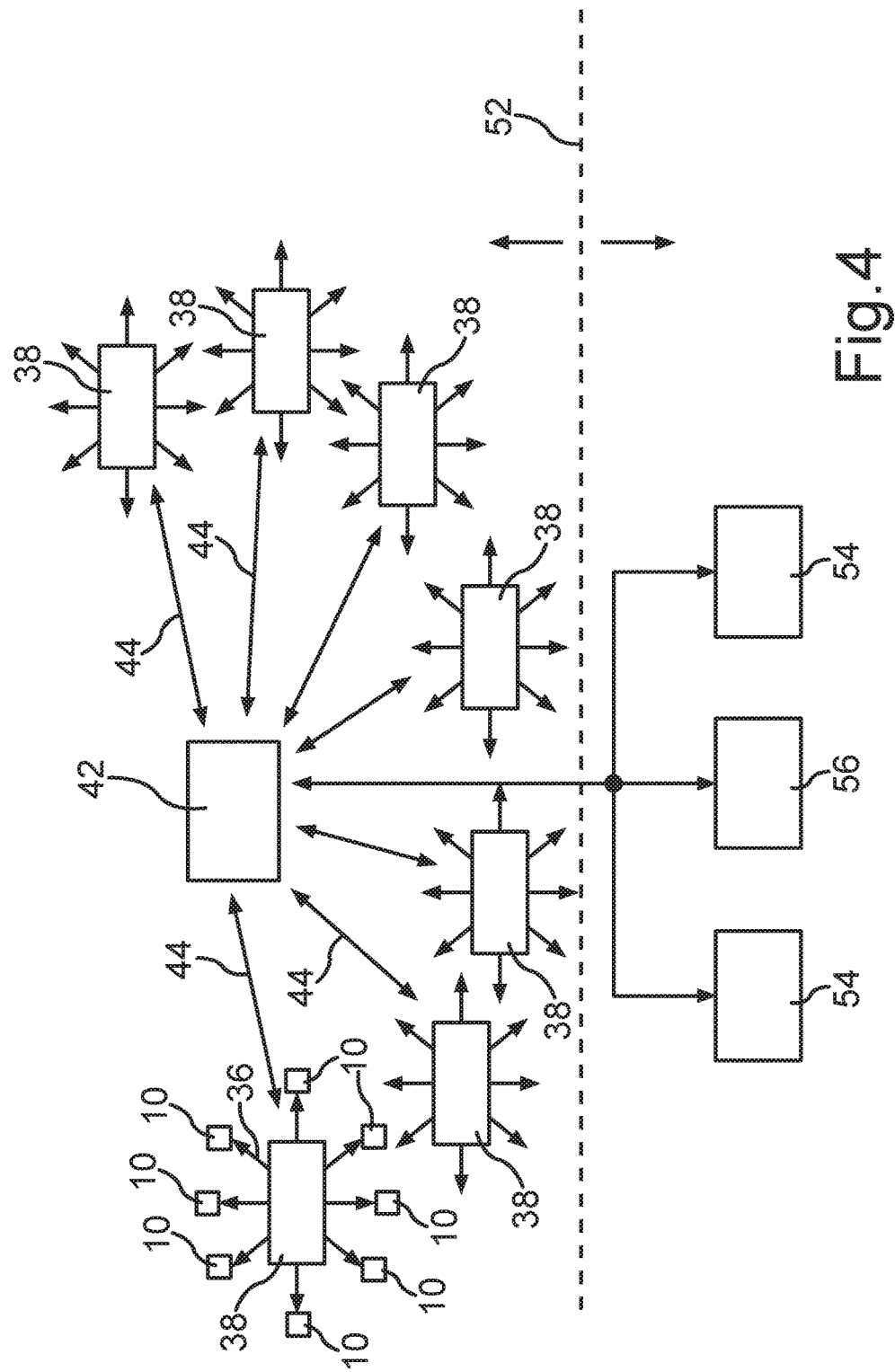
FIG. 4 communication paths between the module controllers and the respective battery cells as well as between the module controllers and the battery controller.

FIG. 4 illustrates the bidirectional communication between the module controllers 38 and the respective battery cells 10 on the basis of corresponding arrows, wherein, in addition, also the bidirectional communication between the module controllers 38 and the battery controller 42 is illustrated by such double arrows. Further illustrated in FIG. 4 is a system boundary 52 of the battery 28, by way of which, for example, the battery controller 42 can communicate with further control units 54 of the motor vehicle and/or with a power electronics unit 56.

On the basis of FIG. 5, a variant of the communication of the first mode 30 shall be illustrated. In this case, pressure waves 58 are emitted from or received by the respective battery cell 10. Devices provided for this purpose can be located inside the battery cell housing 12. In the present case, the respective device comprises a coil 60 and a magnet 62, which can be moved by allowing current to flow through the coil 60. In this way, the battery cell 10 can emit the pressure waves 58. In an analogous way, when the pressure waves 58 are received, the magnet 62 is moved and, correspondingly, the change in the electric field of the coil 60 is recorded by means of the control device 26. For actuation of the coil 60, it is connected to the control device 26 of the battery cell 10. By means of the device in the form of the magnet 62 and the coil 60, it is possible both to produce and to receive the pressure waves 58.

It is shown in FIG. 5 that, by means of the magnet 62, only a region 64 of a respective wall of the battery cell housing 12 can thus be induced to vibrate. For this purpose, this region 64 can be delimited by constrictions or suchlike taperings 66 of adjacent regions of the wall of the battery cell housing 12. The region 64, as with a membrane of a loudspeaker, can thus be induced to vibrate and to emit pressure waves 58.

Figure 6:
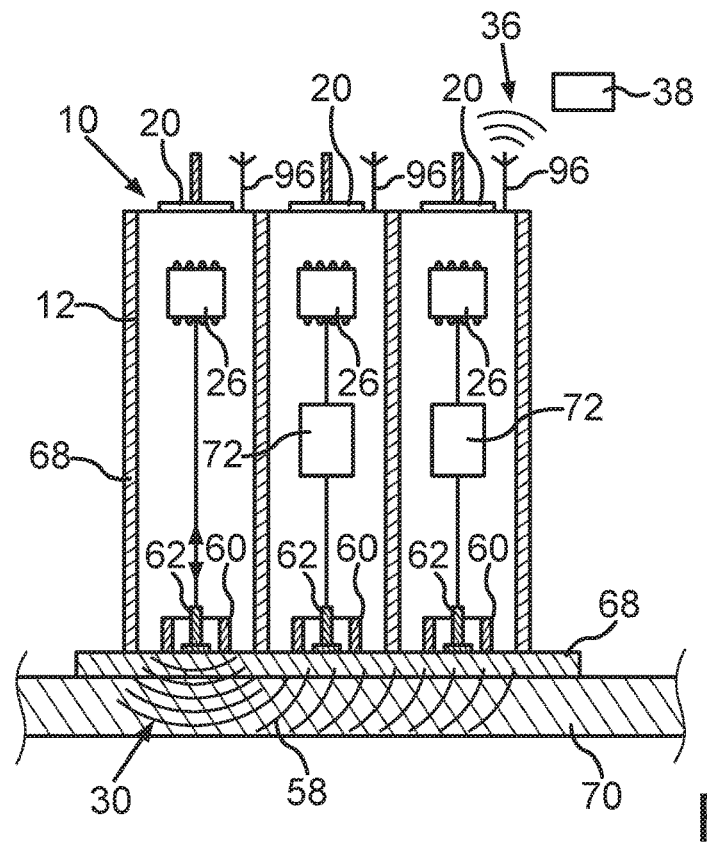
FIG. 6 schematically, the transmission of data via pressure waves from one battery cell to the adjacent battery cells.

The transmission of data in the first mode 30 between the adjacent battery cells 10 shall be illustrated on the basis of FIG. 6. For example, a first battery cell 10, shown in FIG. 6 on the left, emits the pressure waves 58. For this purpose, the control device 26 correspondingly actuates the coil 60, which results in the movement of the magnet 62. The pressure waves 58 spread out through an electric insulation 68, which separates galvanically the battery cell housing 12 which is fabricated from aluminum, for example, of adjacent battery cells 10, from one another.

This electric insulation 68 thus provides for a galvanic separation with respect to a plate 70 of the battery 28 or of the respective battery module 24, which can be designed, for example, as a cooling plate. The pressure waves 58 spread out through the plate 70 to the adjacent battery cells 10. There, the respective communications elements in the form of the coils 60 and the magnets 62 serve as receivers. The pressure waves received by the latter are preferably amplified by means of an amplifier 72 and fed to the control device 26 for analysis. The respective device, which comprises the coil 60 and the magnet 62, accordingly serves both as an actuator—for instance, in the form of a magnetic coil formed as a resonator—and as a sensor in the manner of a microphone or the like.

The pressure waves 58 can also be emitted by way of the electrical connection terminals 20, 22 of the respective battery cell 10 onto the bus bars 74, which connect the individual battery cells 10 with one another in an electrically conductive manner (compare FIG. 17). For this purpose, a pin-shaped bolt 76 of the respective electrical connection terminal 20, 22 can pass through the respective bus bar 74 and, for instance, be joined to the bus bar 74 by means of welding or by screwed connection. Accordingly, the device that provides the pressure waves 58 can also be arranged in the region of the electrical connection terminal 20, 22, with, in particular, an arrangement also being possible outside the battery cell housing 12.

Figure 7:
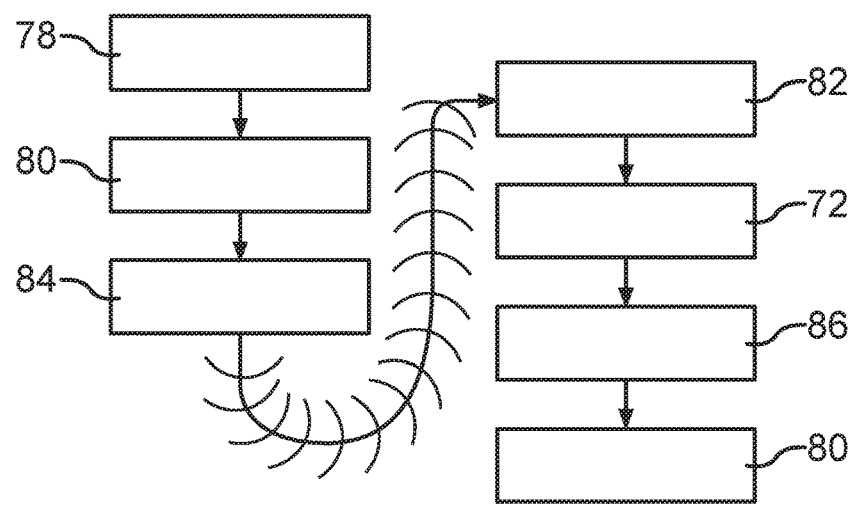
FIG. 7 a flow chart, which illustrates the transmission of information by means of pressure waves.

FIG. 7 illustrates how, in a step 78, the control device 26 can actuate the coil 60 for emission of a message 80. In the process, the message 80 can be encoded in a coding step 84 prior to the passive reception 82. Via the amplifier 72, the encoded message 80 can then reach the control device 26 of the receiving battery cell 10, where, after a decoding step 86, the message 80 is recorded.

Figure 8:
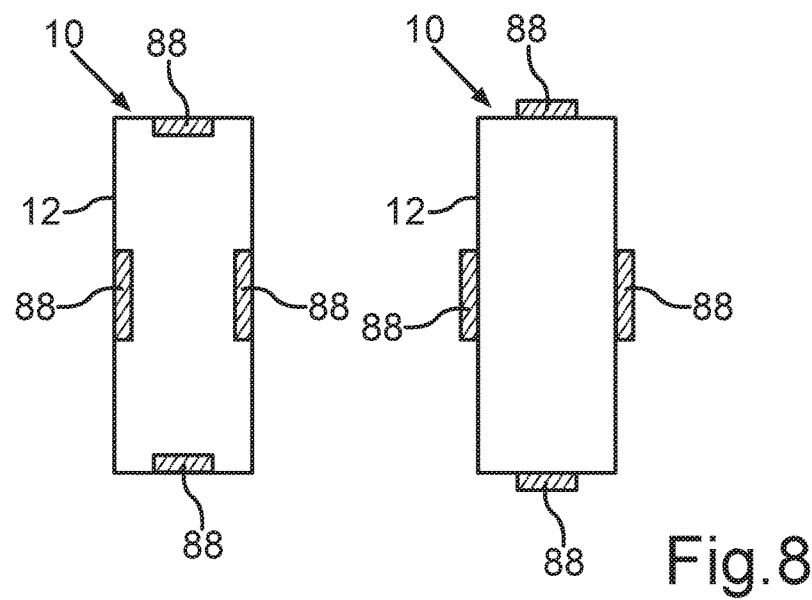
FIG. 8 a battery cell with alternative devices for producing and for receiving pressure waves, which are designed as a piezo element and are arranged inside the battery cell or outside the battery cell.

The pressure waves 58 can also excite the battery cell housing 12, the region 64, the respective connection terminal 20, 22, and/or the bolt 76 by means of a piezo element 88 (that is, by means of a piezoelectric sensor and actuator). Shown in FIG. 8 are possible arrangements of such a piezo element 88 inside the battery cell housing 12 or outside the battery cell housing 12. Accordingly, the piezo elements 88 can be arranged on a floor, at the side walls, and/or at a cover of the battery cell housing 12. The transmission of the pressure waves 58, which are produced by the piezo element 88, preferably occurs in the ultrasound region via all mechanically coupled other parts of the battery cell 10.

Figure 9:
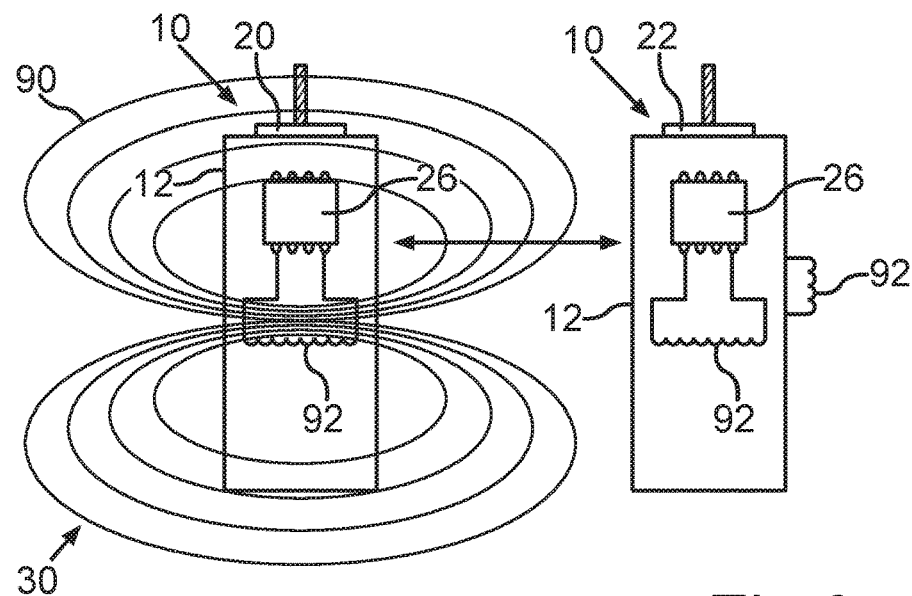
FIG. 9 schematically, a battery cell that communicates with an adjacent battery cell via magnetic waves.

FIG. 9 illustrates how the communication between the adjacent battery cells 10 in the first mode 30 can occur by means of magnetic waves 90. In this case, the respective battery cell 10 comprises a coil 92, which produces the magnetic waves 90, as a communications device. At least one further coil 92 of an adjacent battery cell 10 can detect the magnetic waves 90 provided by the transmitting coil 92 and thus receive corresponding messages. In FIG. 9, the coil 92 is arranged, for the transmitting battery cell 10, inside the battery cell housing 12. However, for the receiving battery cell 10, by way of example, a further coil 92, which is attached to the outer side of the battery cell housing 12, is shown. The coil 92 can be attached adhesively, for example, on the outer side of the battery cell housing 12. Likewise, the coils 92 arranged in the interior of the battery cell housing 12 can rest against an inner side of the battery cell housing 12. In this case, the battery cell housing 12 is designed in such a way that the magnetic waves emitted and/or received by the coils 92 can pass through the battery cell housing 12.

Figure 10:
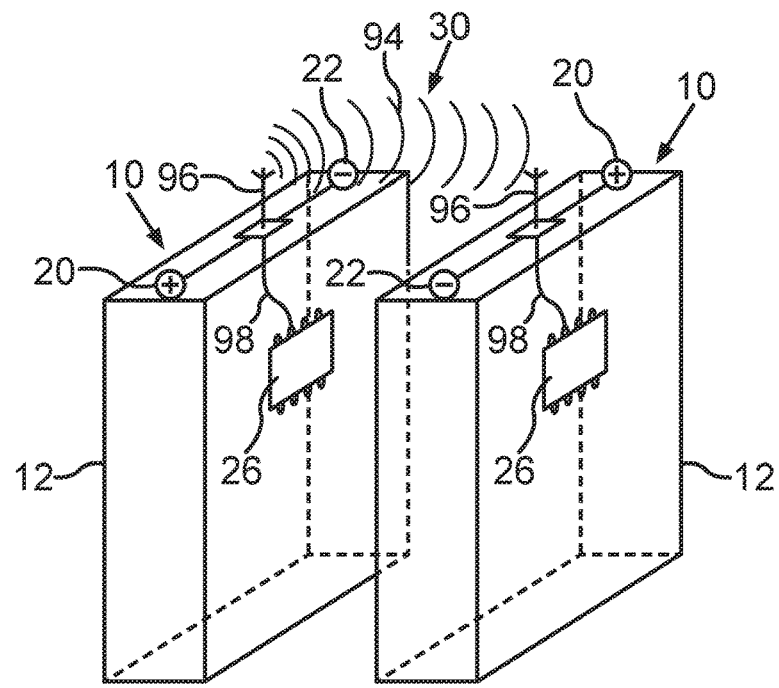
FIG. 10 the communication between adjacent battery cells via terahertz waves.

On the basis of FIG. 10, another possibility of communication between adjacent battery cells 10 shall be illustrated. In this case, the communication occurs in the first mode 30 via terahertz waves 94. These terahertz waves 94 have a small range of only a few centimeters, which, however, ensures a transmission to the adjacent battery cell 10 in a secure and, in particular, interference-free manner. A corresponding communications device, which, in FIG. 10, is constructed as an antenna 96, is arranged in this case, for example, at an outer side of the battery cell housing 12. The antenna 96 can be arranged, for example, between the two electrical connection terminals 20, 22 of the respective battery cell 10.

The data transmission between the antenna 96 and the control device 26 of the respective battery cell 10 (and also the energy transmission) can occur via a cable 98. However, it is also possible to provide a wireless cable-free data transmission and/or energy transmission between the antenna 96 and the control device 26 of the respective battery cell 10.

The energy supply of the antenna 96 can be ensured, furthermore, by way of an electrical connection to the electrical connection terminals 20, 22 of the respective battery cell 10.

Figure 11:
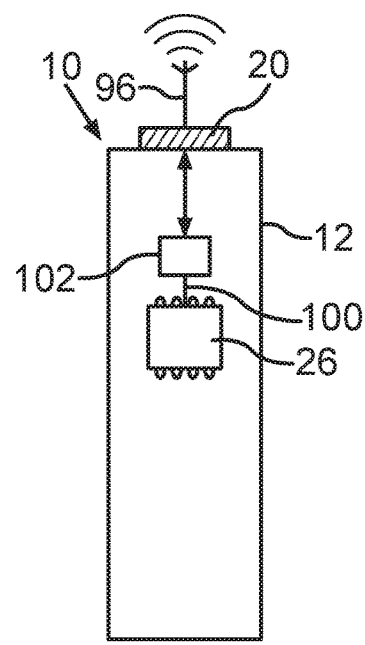
FIG. 11 one of the battery cells shown in FIG. 10 in a schematic sectional view.

As ensues from FIG. 11, it is also possible for a data link to occur between the control device 26 and an interface 102 inside the battery cell housing 12 via a cable or a lightwave guide 100, while the data transmission from the interface 102 to the antenna 96 can occur without cable or wirelessly. However, it is also possible for the communication between the region inside the battery cell housing 12 and outside the battery cell housing 12 to occur by way of a cable, a lightwave guide, or the like transmission lines.

Figure 12:
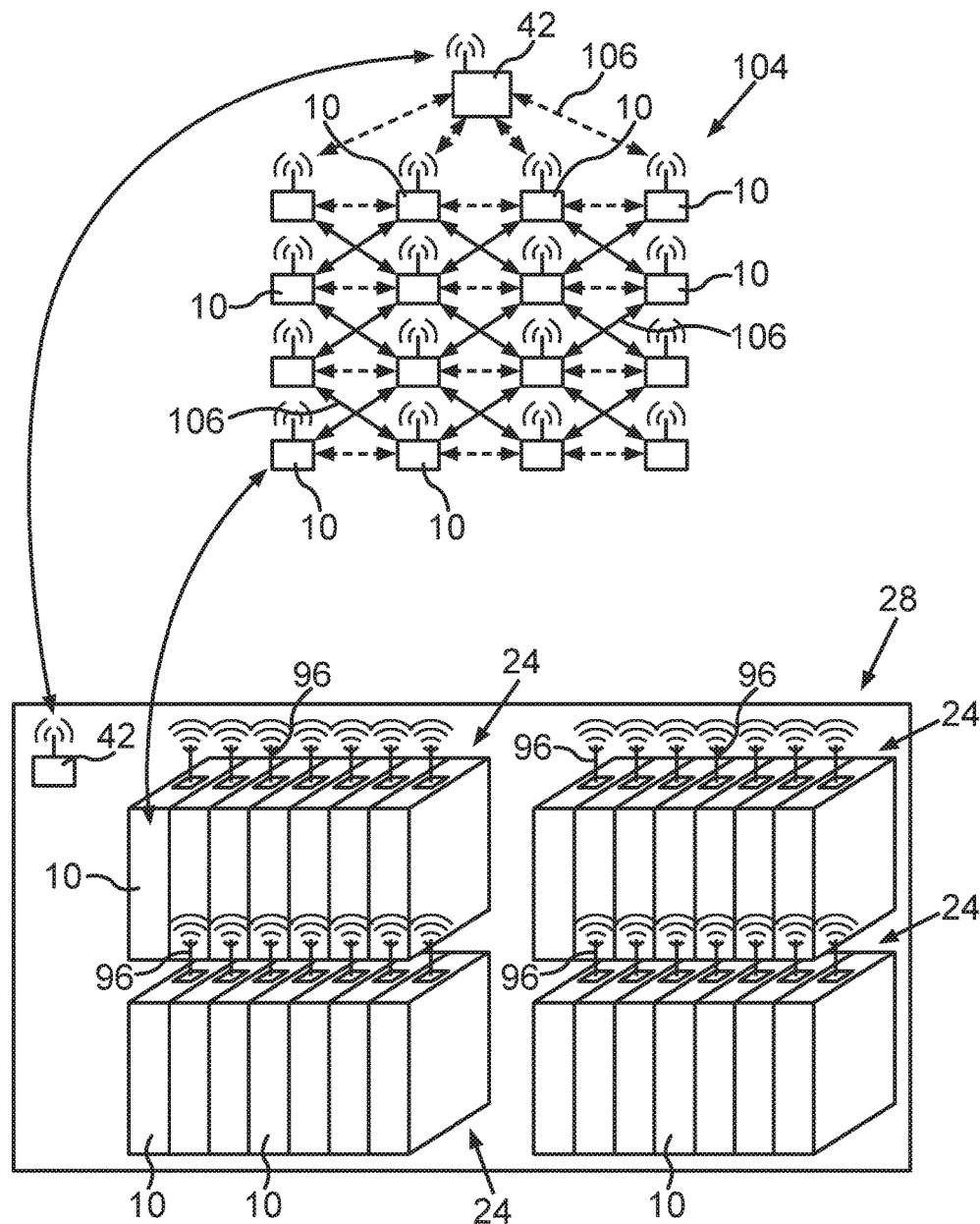
FIG. 12 the communication of the battery cells with one another as well as with a master control device via a meshed network.

On the basis of FIG. 12, it can be illustrated how the communication inside the battery 28 can occur when the control devices 26 of the individual battery cells 10 and the master control devices—for instance, in the form of the module controller 38 and/or the battery controller 42—form a meshed network 104. In this case, it is assumed for simplicity that the respective battery cells 10 communicate directly with the battery controller 42 by way of their antennas 96.

On account of the high packing density and the high metal content in the surroundings of the respective battery cell 10, which for example, is arranged in the respective battery module 24, corresponding protocols are preferably provided here for the data transmission, which take into account these special surroundings. For example, it can be provided in accordance with a listen-and-talk principle that, first of all, a free band or a free channel is located in order to then make possible the data transmission. In this case, time division duplex methods, time division multiplex methods, and/or frequency division multiplex methods can be employed.

In this case, an especially favorable length of a respective block of data in regard to the data transmission can differ in the battery module 24 depending on the site of arrangement of the battery module 24 in the battery 28. In addition, these data block lengths or data burst lengths can change over the course of time, depending, for instance, on the period of time just necessary for sending a data packet. It is thereby possible to ensure that all required information arrives at the receiver intended for the message as quickly as possible and as securely as possible.

In order to provide in the surroundings of the battery 28 an especially robust and low-echo protocol for the data transmission, it is possible in the case of the meshed network 104 to provide a lower data transmission rate than in the case of meshed networks in other applications. For example, the data transmission rate can be smaller by a factor of 32 than in the case of other applications in which meshed networks are employed.

In the meshed network 104, preferably the battery controller 42 (or, when module controllers 38 are provided at the level of the respective battery modules 24, the module controller 38) provides a corresponding timing or synchronization of the individual network nodes. It is thereby possible to ensure that the data to be transmitted are not lost in a diversity of simultaneously emitted messages and hence can no longer be identified. The battery controller 42 and/or the module controller 38 thus provide an adequate stillness in order to ensure a secure transmission in such surroundings.

As ensues from FIG. 12, in the meshed network 104 or MESH network, the individual network nodes are connected to one another via a plurality of signal paths 106. In this way, a communication of the battery cells 10 both with one another and with the respective master control device is possible in the form of, for instance, the module controller 38 or the battery controller 42. The meshed network 104 or network provides an especially high reliability against failure, because the respective message can utilize different signal paths 106 in order to reach one of the battery cells 10 or the master control device, for example, the battery controller 42.

In the meshed network 104, the signal paths 106 can be wireless transmission paths in that, for instance, electromagnetic waves in the megahertz and/or gigahertz range are utilized. However, it is also possible, for the data transmission in the meshed network 104 to employ lightwave guides or other wired signal paths 106. In addition, the signal paths 106 can also make use of one of the communications of the first mode 30 that were described with reference to FIGS. 1 to 10. It is also possible to provide a plurality of redundant signal paths 106 between two network nodes, in order to ensure that at least one useable signal path 106 is always available.

Also for the use of the antennas 96 for the communication via electromagnetic waves in the megahertz and gigahertz range, the antennas 96 are arranged preferably outside the battery cell housing 12. In this case, the energy supply can occur via the battery terminals or connection terminals 20, 22. Furthermore, a wireless data transmission and/or wireless energy transmission, in particular, an inductive energy transmission, can be provided by means of magnetic fields.

Figure 13:
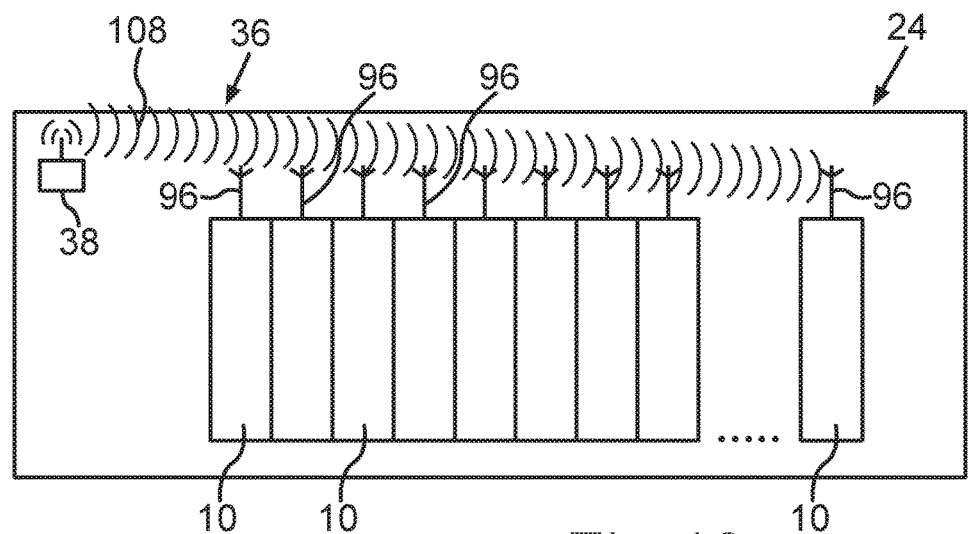
FIG. 13 the communication of a module controller with the battery cells of the battery module via Bluetooth, WLAN, or WiFi.

FIG. 13 shows a further possibility of communication in the second mode 36. It is thereby possible, for example, to provide a point-to-point connection based on electromagnetic waves inside the battery module 24, such as, for example, via Bluetooth 108, in particular, via Bluetooth low energy (BTLE). In this case, it is possible, for instance, for the module controller 38 to query the individual battery cells 10 and to communicate with them in succession. When a plurality of module controllers 38 communicate with the battery cells 10 of the respective battery module 24, the battery controller 42 of the battery 28 can ensure that no mutual interference occurs during the communication. On account of the high metal content inside the respective battery module 24 and the relatively small transmission distance resulting from this, such an orderly communication is of importance.

In this mode 36 of communication as well, the antennas 96, designed as transmitters and receivers, are preferably located outside the battery cell housing 12. Here, too, the energy transmission and/or the data transmission can occur in a wired manner via, for example, the terminals or electrical connection terminals 20, 22 or wirelessly or cable-free. In the case of wired data transmission, lightwave guides can also be employed. Furthermore, light sources, in particular in the form of light-emitting diodes, can emit light signals. A receiver, such as, for instance, the antenna 96 and/or at least one sensor for detecting parameters of the battery cell 10 can be supplied with energy via the emitted light. Through a pulsed emission of light, it is possible, moreover, to transmit, together with energy, also information in modulated form.

The module controller 38 can, in particular, query the individual battery cells 10 in sequence and, after the last battery cell 10 inside the battery module 24 has been queried, start over once again with the query of the first battery cell 10.

Figure 14:
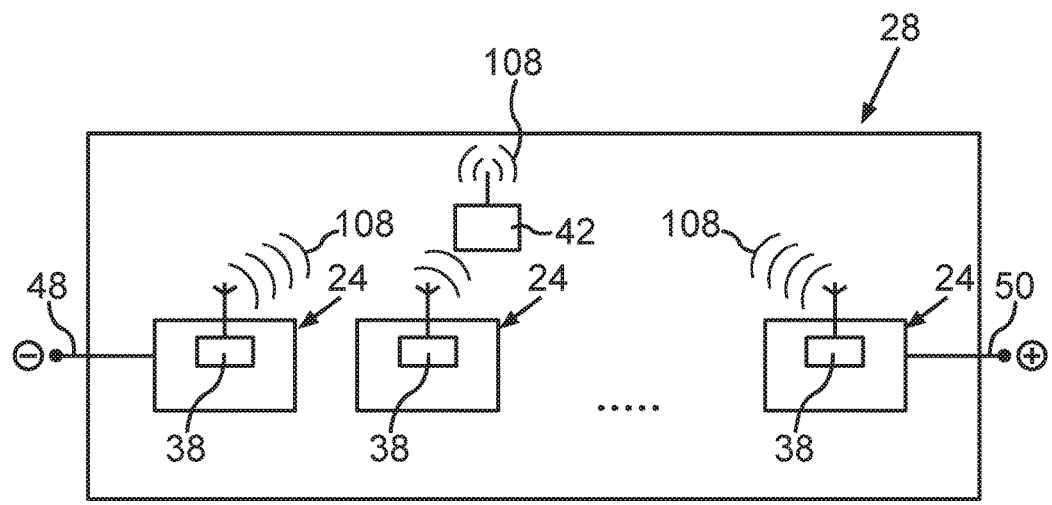
FIG. 14 the communication of the module controller of the battery with the battery controller via electromagnetic waves.

FIG. 14 illustrates the communication between the module controllers 38 and the battery controller 42. Here, too, it is possible for a communication to take place via, for example, Bluetooth 108, WLAN, or WiFi, wherein the battery controller 42, first of all, queries a first one of the module controllers 38 and then queries the next module controller 38. After the query of the last module controller 38 inside the battery 28, the battery controller 42 can then query once again the first module controller 38.

Figure 15:
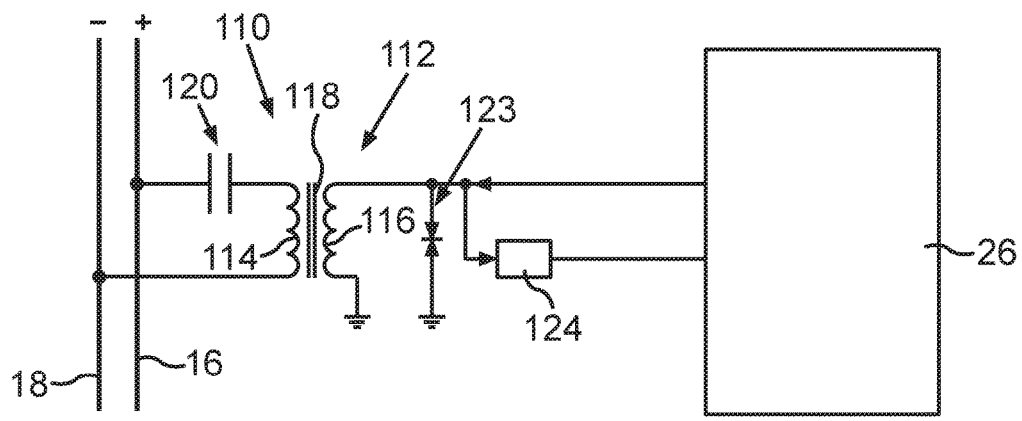
FIG. 15 schematically, components of a modulation device of one of the battery cells, which is designed for data transmission between the battery cells via connecting elements that convey electrical current.

FIG. 15 illustrates components of a respective battery cell 10, which can be employed for a further possibility of communication. In this case, a carrier frequency communication is employed, which is also referred to as "powerline communication" (PLC) in power grids. In this case, the data exchange between the individual battery cells 10 occurs via the respective electrical connection terminals 20, 22 and data are modulated on the (high-voltage) power grid.

A corresponding modulation device 110 is shown schematically in FIG. 15. The modulation device 110 comprises a transformer 112 with a first coil 114 and a second coil 116, which make it possible to transmit alternating magnetic fields via a transformer core 118. By way of a capacitor 120, the signal—for example, a high-frequency signal—is in-coupled into the galvanic element 14 of the battery cell 10, of which, in FIG. 15, solely the two arresters 16, 18 are shown.

The capacitor 120 decouples the control device 26 of the battery cell 10 from the direct current voltage of the galvanic element 14. The in-coupling of signals via the first coil 114 into the second coil 116 and accordingly the transmission of data to the control device 26 occur also via the capacitor 120. Preferably, for protection of the control device 26, a voltage limiter 123—which is, in particular, bidirectional—is provided. Furthermore, a filter 124 can provide for the suppression of noise and to filter out interfering pulses. The modulation device 110 is preferably designed as a low-power application or as an ultra-low-power application.

As modulation methods for the transmission of data via the bus bars 74 of the battery 28, it is possible to employ, for example, the S-FSK method (S-FSK=spread-frequency shift keying) or the OFDN method (OFDN=orthogonal frequency-division multiplexing). In the latter case, any crosstalk between signals that are modulated on adjacent carriers is reduced. The data transfer speed in this case can be 200 kbps (kilobits per second) up to, for instance, 500 kbps.

FIG. 17 illustrates the transmission of data 122 via the bus bars 74 by modulating the data on the (high-voltage) power grid. In this case, the data 122 can be transmitted, in particular, in encrypted form. Furthermore, a transmission 125—which, in particular, is encrypted—of the data 122 to the master control unit—for example, to the battery controller 42—is provided. The battery controller 42 can, in turn, communicate via a bus system, such as, for example a CAN bus, with the other control units of the motor vehicle.

The invention claimed is:

1. A battery for a motor vehicle having at least one master control device and a plurality of battery cells, wherein, for each respective battery cell in the plurality of battery cells, the battery cell comprises:
 a battery cell housing, in which a galvanic element is accommodated,
 two electrical connection terminals, by way of which the battery cell is electrically connected to at least one other battery cell in the plurality of battery cells, and
 a battery cell control device, which is coupled to at least one communications device of the battery cell,
 wherein the at least one communications device of the battery cell is configured to communicate with at least one battery cell in the plurality of battery cells that is adjacent to the battery cell in a first mode and with the at least one master control device of the battery in a second mode, which differs from the first mode.

2. The battery according to claim 1, wherein at least one battery cell in the plurality of battery cells having at least one communications device configured to communicate in the first mode comprises at least one coil and a magnet configured to move relative to the coil and a device including a piezo element configured to produce and receive pressure waves.

3. The battery according to claim 1, wherein at least one battery cell in the plurality of battery cells having at least one communications device configured to communicate in the first mode has at least one device including a coil configured to produce and receive magnetic waves.

4. The battery according to claim 1, wherein at least one battery cell in the plurality of battery cells having at least one communications device configured to communicate in the first mode has at least one device, which is arranged at an outer side of the battery cell housing, configured to produce and receive electromagnetic terahertz waves.

5. The battery according to claim 1, wherein at least one battery cell in the plurality of battery cells having at least one communications device configured to communicate in the first mode and the second mode has at least one device, which is arranged at an outer side of the battery cell housing, configured to produce and receive electromagnetic gigahertz waves and megahertz waves.

6. The battery according to claim 4, further comprising means for wireless energy transmission from the galvanic element of the respective battery cell to the device arranged at the outer side of the battery cell housing and means for wireless data transmission from the control device to the device arranged at the outer side of the battery cell housing.

7. The battery according to claim 1, wherein the control devices of the respective battery cells and the at least one master control device of the battery form network nodes of a meshed network, which is completely meshed.

8. The battery according to claim 1, wherein the battery has a plurality of battery modules each having a respective group of battery cells, wherein the at least one master control device has a module controller configured to communicate with the battery cells of a battery module in the plurality of battery modules, wherein the at least one master control device has a battery controller of the battery and the module controller is configured to communicate with the battery controller.

9. The battery according to claim 1, wherein at least one battery cell in the plurality of battery cells has a modulation device, said modulation device configured to exchange data via an electrical connecting element with at least one other battery cell and with the master control device, with said connecting element connecting the at least one battery cell with the at least one other battery cell of the battery and with the master control device.

10. The battery according to claim 8, wherein the module controller of the at least one master control device is configured to communicate via Bluetooth.

\* \* \* \* \*